Z. Tobias,
Horse Power.

N°. 69,865.         Patented Oct. 15, 1867.

Witnesses.  
Theo Tusche  
Wm Treurn

Inventor  
Z Tobias  
Per Munn & Co  
Attorneys

United States Patent Office.

ZACHARIAS TOBIAS, OF COVINGTON, OHIO.

*Letters Patent No. 69,865, dated October 15, 1867.*

---

IMPROVEMENT IN HORSE-POWER.

---

*The Schedule referred to in these Letters Patent and making part of the same.*

---

TO ALL WHOM IT MAY CONCERN:

Be it known that I, ZACHARIAS TOBIAS, of Covington, in the county of Miami, and State of Ohio, have invented a new and improved Horse-Power; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved horse-power, so constructed and arranged that the labor of loading the horse-power upon and unloading it from a wagon every time it is transported from one place to another may not be necessary.

And it consists in the combination of the frame or frames, line-shaft, centre-shaft, ropes or chains, and windlass with each other and with the frame of the machine, in permanently attaching the power to the bolsters or axles of a wagon, in the combination of the timbers and braces with the wheels of the wagon and frame of the power, and in the manner in which the levers or sweeps are attached to the main wheel.

Figure 1:
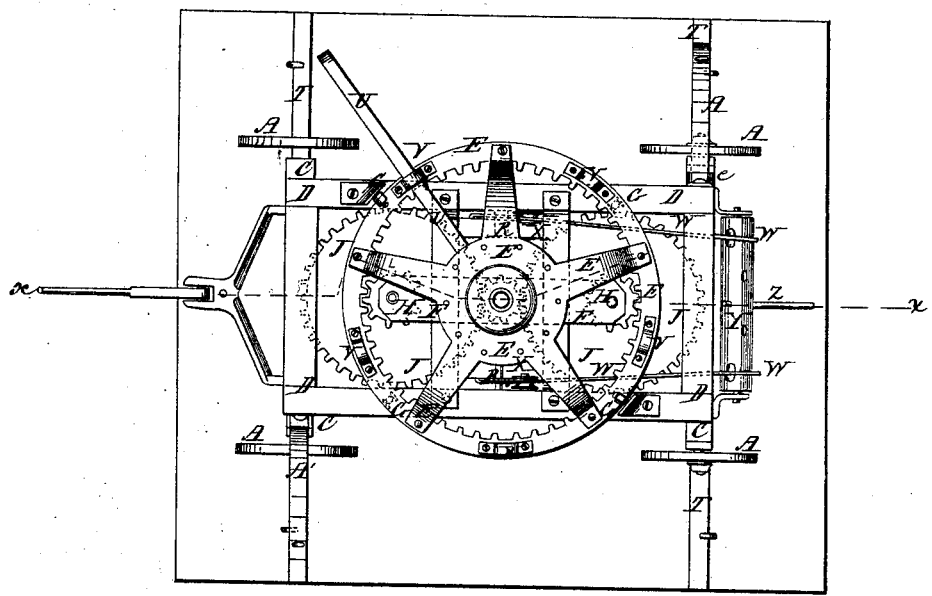
Figure 1 is a top or plan view of my improved machine.
Figure 2:
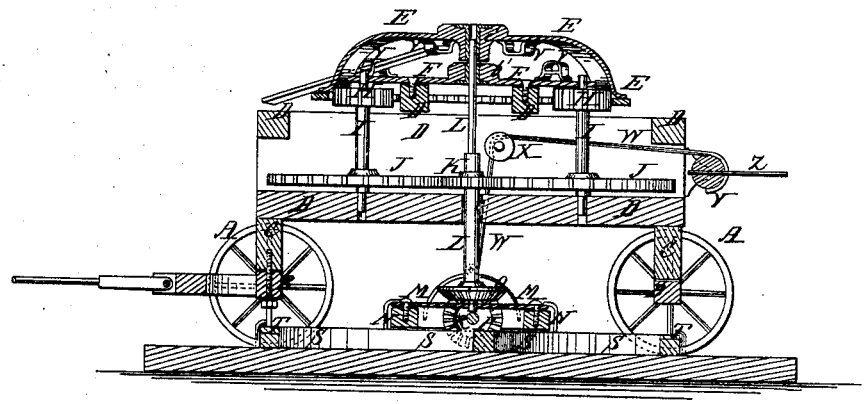
Figure 2 is a detail sectional view of the same, taken through the line $x$ $x$, fig. 1.

A are the wheels, B are the axles, and C are the bolsters of the wagon. D is the frame of the machine, which is permanently and securely attached to the bolsters C. E is the drive or master-wheel, which is made dish-shaped, as shown in figs. 1 and 2, and the hub $e$ of which rests and revolves upon a projection, $f'$, formed upon the bar or plate F. The wheel E is kept in its proper position while revolving by friction-wheels or rollers G, attached to the frame D. Upon the inner edge of the rim of the wheel E are formed teeth, into which mesh the teeth of the pinion-wheels H, attached to the shafts I. The upper ends of the shafts I revolve in bearings in the ends of the bar or plate F, and their lower ends in bearings in the frame D. To the lower part of the shafts I are attached large gear-wheels J, the teeth of which mesh into the teeth of the pinion-wheel K, attached to the centre-shaft L. The upper end of the shaft L revolves in bearings in the projection $f'$ of the bar F, and in the hub $e'$ of the wheel E, and its lower end revolves in bearings in the bar M, attached to the frame N. The upper part of the central shaft L is so formed that it will pass up freely through its bearings $f'$, and through the hub $e'$. To the lower part of the shaft L is attached a bevel gear wheel, O, the teeth of which mesh into the teeth of the bevel gear-wheel P, attached to the line-shaft R. The shaft R revolves in bearings in the frame N, and it is so formed that the gear-wheel P may be reversed and placed upon the shaft R, upon the other side of the gear-wheel O, so as to revolve the shaft R in the opposite direction. The ends of the line-shaft R should be so formed that the machinery to be driven may be coupled to either of its ends, or so that two separate machines may be driven by the same power at the same time. The frame N rests upon the frame S, to which it may be permanently attached, or into which it may be framed. The ends of the diagonal frame S rest against the timbers T. The timbers T pass across the machine through the opposite wheels, and have notches or cross-slots formed upon their lower sides, to receive the rims of the said wheels. The timbers T and frames N and S rest upon and are securely pinned to the ground, so as to hold the machine immovably in place while being operated. A' are inclined braces, the upper ends of which enter sockets attached to the frame D, and their lower ends are pinned to the timbers T, to give still greater stability to the machine. U are the levers or draught-bars, to which the horses are attached, and which are placed in sockets V, formed upon or secured to the wheel E, as shown in figs. 1 and 2; the inner socket being placed at a higher elevation than the outer one, so that the outer end of the said bars may project downward into a convenient position for the attachment of the horses. To the frame N, upon opposite sides, or to bails attached thereto, are attached the lower ends of the ropes or chains W, which pass over the pulleys X, pivoted to the frame D, and their upper ends are attached to the shaft or windlass Y, pivoted to the end of the frame D. By revolving the axle Y, by means of a lever, Z, or a crank, the frame N and its attachments will be raised up away from the ground, so that the machine may be readily drawn from place to place.

What I claim as new, and desire to secure by Letters Patent, is—

1. The combination of the frame or frames N S, line-shaft B, and centre-shaft L with each other, substantially as herein shown and described, and for the purpose set forth.

2. The combination of the ropes or chains W and shaft or windlass Y with the frame N and its attachments, and with the frame D, substantially as herein shown and described, and for the purpose set forth.

3. Permanently attaching the power to the bolsters or axles of a wagon, substantially as herein shown and described, and for the purpose set forth.

4. The combination of the timbers T and braces A' with the wheels A and frame D of the machine, substantially as herein shown and described, and for the purpose set forth.

ZACHARIAS TOBIAS.

Witnesses:
   Absalom B. Kepner,
   Samuel Nicodemus.